Aug. 24, 1943.　　　　J. D. KARLE　　　　2,327,845
ROTARY HOOKS FOR SEWING MACHINES
Filed Nov. 5, 1940

Witness:
John H. Cave

Inventor
John D. Karle
By John F. Heine
Attorney

Patented Aug. 24, 1943

2,327,845

UNITED STATES PATENT OFFICE 2,327,845

ROTARY HOOK FOR SEWING MACHINES

John D. Karle, Roselle Park, N. J., assignor to The Singer Manufacturing Company, Elizabeth, N. J., a corporation of New Jersey Application November 5, 1940, Serial No. 364,373

3 Claims. (Cl. 112—228)

This invention relates to sewing machines and more particularly to a rotary hook for sewing machines and has for its objective an improved means of securing a fan to the hook-body.

Another object of the invention is to fix the portions of the fan-blades which travel at the highest speed to the hook-body so that vibration and hum will be reduced to a minimum.

With the above and other objects on view, as will hereinafter appear, the invention comprises the devices, combinations and arrangements of parts hereinafter set forth and illustrated in the accompanying drawing of a preferred embodiment of the invention, from which the several features of the invention and the advantages attained thereby will be readily understood by those skilled in the art.

Figure 1:
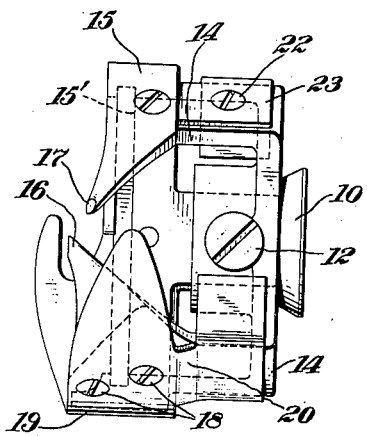
Fig. 1 is a side elevation of a rotary hook for sewing machines showing my improved fan arrangement embodied therein.
Figure 2:
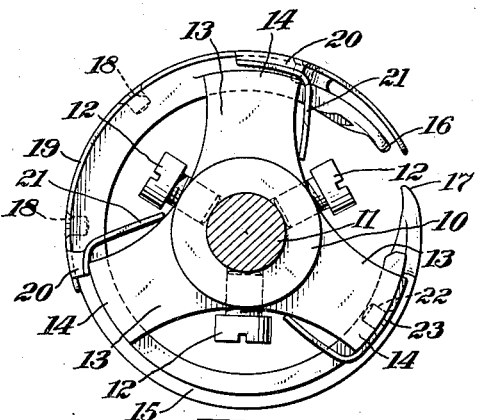
Fig. 2 is a rear elevation of the hook shown in Fig. 1.
Figure 3:
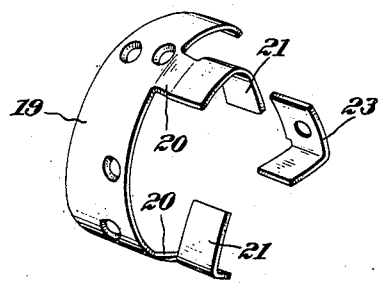
Fig. 3 is a perspective view of the fan.

In the embodiment selected for illustration the cup-shaped hook-body comprises the hub 10 which is adapted to be secured to a rotary shaft 11 by the screws 12. The hub is formed with radially extending arms 13 made integral with the laterally extending arms 14 which carry the rim portion 15 formed with a loop-seizing beak 16 and a loop-controlling tail 17, the rim portion between the beak 16 and tail 17 being cut away to provide a space for entrance of the needle-thread. The inner surface of the rim is provided with a raceway 15' in which the usual stationary thread-case is journaled. The above described hook is fully shown and described in my copending application Serial No. 269,357, filed Apr. 22, 1939, to which reference may be had for a more detailed description of the hook.

Fixed to the rim 15 by the screws 18 is a sheet-metal guard-plate 19 formed with laterally extending leg-portions 20 which carry the L-shaped fan-blades 21. The leg-portions 20 and one limb of the L-shaped fan-blades 21 overlie two of the arms 14 and the free limb of the fan-blade extends into the chamber located at the side of the rim and towards the hub of the hook. To the third arm 14 there is secured by the screw 22 a separate L-shaped fan-blade 23 the free end of which also extends into the chamber and towards the hub of the hook.

Figure 4:
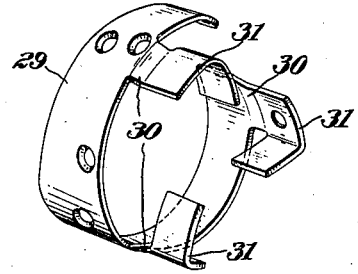
Fig. 4 is a perspective view of a modified form of fan for the hook shown in Figs. 1 and 2.

In the modification illustrated in Fig. 4 the guard-plate 29 is adapted to be secured to the rim 15 of the hook by screws, and it embraces the rim of the hook throughout its periphery except for the gap between the loop-seizing beak 16 and the loop-controlling tail 17. Three laterally extending legs 30 are provided each of which carry an L-shaped fan-blade 31, the free limbs of which extend into the chamber and towards the hub of the hook.

From the foregoing it will be observed that each of the fan-blades is arranged so that the portion which will travel at the greatest speed is fixed to the hook-body. As rotary hooks attain a speed of 10,000 R. P. M. this is a highly advantageous feature. It will be obvious that as the fan-blades are made of sheet metal the free ends of the blades may be turned to any desired angle relative to their axis of rotation so that, instead of acting as a centrifugal fan as illustrated, the fan blades may act to blow air directly upon the hook.

Having thus set forth the nature of the invention what I claim herein is:

1. A rotary hook for sewing machines comprising a cup-shaped body formed with a rim portion and a centrally located hub, the rim portion being formed with a loop-seizing beak and a gap adjacent said beak, a guard-plate secured to the outer periphery of the rim portion and fan-blades carried by said guard-plate.

2. A rotary hook for sewing machines comprising a cup-shaped body formed with a rim portion and a centrally located hub, the rim portion being formed with a loop-seizing beak and a gap adjacent said beak, a guard-plate secured to the outer periphery of the rim portion and formed with a laterally extending leg, and an L-shaped fan-blade carried by said leg, one limb of the fan-blade being secured to the leg and the free limb extending inwardly towards the hub.

3. A rotary hook for sewing machines comprising a body having an axial hub, radial arms carried by and extending outwardly from said hub, a laterally extending arm fixed to the free end of each of the radially extending arms, said laterally extending arms being arranged parallel to and spaced from and overhanging said hub, thereby forming an air space between said arms and hub, a rim carried by the laterally extending arms and formed with a loop seizing beak and a thread-case raceway, and a fan blade mounted at one end on a part of said hook-body remote from said hub and extending inwardly into said air space and terminating at its free end adjacent said hub.

JOHN D. KARLE.